(12) United States Patent
Togo et al.

(10) Patent No.: US 11,066,811 B2
(45) Date of Patent: Jul. 20, 2021

(54) CONSTRUCTION MACHINERY, MOBILE INFORMATION TERMINAL FOR ACQUIRING OPERATION DATA FROM CONSTRUCTION MACHINERY, CONSTRUCTION MACHINERY INFORMATION COMMUNICATION SYSTEM, AND PROGRAM IMPLEMENTED ON MOBILE INFORMATION TERMINALS

(71) Applicant: KOBELCO CONSTRUCTION MACHINERY CO., LTD., Hiroshima (JP)

(72) Inventors: Hiroshi Togo, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 318 days.

(21) Appl. No.: 16/080,567

(22) PCT Filed: Feb. 24, 2017

(86) PCT No.: PCT/JP2017/007006
§ 371 (c)(1),
(2) Date: Aug. 28, 2018

(87) PCT Pub. No.: WO2017/150359
PCT Pub. Date: Sep. 8, 2017

(65) Prior Publication Data
US 2020/0181886 A1    Jun. 11, 2020

(30) Foreign Application Priority Data
Mar. 4, 2016    (JP) .............................. JP2016-042319

(51) Int. Cl.
*E02F 9/26*    (2006.01)
*E02F 9/20*    (2006.01)
(Continued)

(52) U.S. Cl.
CPC ............ *E02F 9/267* (2013.01); *E02F 9/2054* (2013.01); *E02F 9/205* (2013.01); *E02F 9/2296* (2013.01); *G07C 5/008* (2013.01); *H04Q 9/00* (2013.01)

(58) Field of Classification Search
CPC ......... E02F 9/267; E02F 9/2054; E02F 9/205; E02F 9/2296; G07C 5/008; H04Q 9/00;
(Continued)

(56) References Cited

U.S. PATENT DOCUMENTS 6,778,097 B1 *   8/2004   Kajita ...................... E02F 3/437
                                                              340/12.5
9,147,119 B2 *   9/2015   Prakash .................... H04N 5/44
(Continued)

FOREIGN PATENT DOCUMENTS

CN      101183262 A      5/2008
CN      201801903 U      4/2011
(Continued)

OTHER PUBLICATIONS

International Search Report dated Mar. 28, 2017 in PCT/JP2017/007006 filed Feb. 24, 2017.
(Continued)

*Primary Examiner* — Russell Frejd
(74) *Attorney, Agent, or Firm* — Oblon, McClelland, Maier & Neustadt, L.L.P.

(57) ABSTRACT

A vehicle-side control unit determines whether a long distance communication mechanism is available or not, when determining that the long distance communication mechanism is available, controls a first vehicle-side communica-
(Continued)

tion unit to transmit operation data via the long distance communication mechanism, and when determining that the long distance communication means is not available, causes a vehicle-side storage unit to store the operation data, and further determines whether a transmission start command is received from a tablet or not, and when determining that the transmission start command is received, controls a second vehicle-side communication unit to transmit the operation data stored in the vehicle-side storage unit via a short distance communication mechanism.

9 Claims, 11 Drawing Sheets

(51) Int. Cl.
*E02F 9/22* (2006.01)
*G07C 5/00* (2006.01)
*H04Q 9/00* (2006.01)

(58) Field of Classification Search
CPC ............... G05B 23/02; G05B 19/4185; G05B 19/41895
See application file for complete search history.

(56) References Cited

U.S. PATENT DOCUMENTS 9,300,152 B2 * 3/2016 Juhasz ..................... H02J 7/00
9,600,734 B2 * 3/2017 Prakash ................. H04N 5/247

| 2003/0203716 | A1 | 10/2003 | Takahashi et al. |
| 2004/0034511 | A1 | 2/2004 | Shibamori et al. |
| 2004/0148083 | A1 | 7/2004 | Arakawa et al. |
| 2012/0136507 | A1 | 5/2012 | Everett et al. |

FOREIGN PATENT DOCUMENTS

| CN | 104903928 A | 9/2015 |
| CN | 105100284 A | 11/2015 |
| EP | 1 441 077 A1 | 7/2004 |
| JP | 2001-222797 A | 8/2001 |
| JP | WO 02/08527 A1 | 1/2002 |
| JP | 2003-46423 A | 2/2003 |
| JP | 2003-96831 A | 3/2003 |
| JP | 2003-318810 A | 11/2003 |
| JP | 1798402 A | 7/2006 |
| JP | 2008-248653 A | 10/2008 |
| JP | 4532789 B2 | 8/2010 |
| JP | 202075615 U | 12/2011 |
| JP | 103135531 A | 6/2013 |
| JP | 103281371 A | 9/2013 |

OTHER PUBLICATIONS

Extended European Search Report dated Mar. 14, 2019 in European Patent Application No. 17759825.7, 9 pages.
Combined Chinese Office Action and Search Report dated May 9, 2020 in Chinese Patent Application No. 201780014663.0 (with unedited computer generated English translation and English translation of Category of Cited Documents), 18 pages.

* cited by examiner

CONSTRUCTION MACHINERY, MOBILE INFORMATION TERMINAL FOR ACQUIRING OPERATION DATA FROM CONSTRUCTION MACHINERY, CONSTRUCTION MACHINERY INFORMATION COMMUNICATION SYSTEM, AND PROGRAM IMPLEMENTED ON MOBILE INFORMATION TERMINALS

TECHNICAL FIELD

The present invention relates to a construction machine which collects operation data for managing the construction machine, as well as transmitting operation data to a server.

BACKGROUND ART

There has been conventionally known a system disclosed in, for example, Patent Literature 1.

The system includes a plurality of construction machines (mobile bodies), and a server (terminal) connected to the construction machines via communication means to manage the construction machines.

The construction machine acquires operation data (information) such as an engine speed, a battery voltage, a fuel amount, a cooling water temperature, abnormality occurrence (error code) of the construction machine, and the like.

The construction machine transmits the acquired operation data to the server via the communication means.

Specifically, the communication means has the Internet, a network control station, a dedicated line, a satellite earth station, a feeder line, a communication satellite, radio communication, and the like. Operation data of the construction machine is transmitted to a communication satellite through radio communication and then transmitted to the server via a communication satellite, a feeder line, a satellite earth station, a dedicated line, a network control station, and the Internet.

In the system disclosed in Patent Literature 1 in which operation data is transmitted from a construction machine to a communication satellite through radio communication, operation data of the construction machine cannot be accumulated in a server when the construction machine is in operation in an area where communication with a communication satellite is not possible, so that the server might have difficulty in managing the construction machine.

CITATION LIST

Patent Literature

Patent Literature 1: U.S. Pat. No. 4,532,789

SUMMARY OF INVENTION

An object of the present invention is to provide construction machinery, a mobile information terminal, and an information communication system which enable execution of processing for accumulating, in a server, operation data of a construction machine being in operation in an area where communication means for transmitting operation data to the server is not available, and a program implemented on the mobile information terminal.

In order to solve the above problem, the present invention provides a construction machine capable of collecting operation data and transmitting the operation data to a server via long distance communication means, the construction machine including: a first vehicle-side communication unit having a function of transmitting the operation data to the server via the long distance communication means; a second vehicle-side communication unit having a function of communicating with a mobile information terminal via short distance communication means for conducting communication in a distance shorter than a distance in the long distance communication means; a vehicle-side storage unit having a region for storing the operation data; and a vehicle-side control unit which determines whether the long distance communication means is available or not, when determining that the long distance communication means is available, controls the first vehicle-side communication unit so as to transmit the operation data via the long distance communication means, and when determining that the long distance communication means is not available, causes the vehicle-side storage unit to store the operation data, and further determines whether a transmission start command is received from the mobile information terminal or not, and when determining that the transmission start command is received, controls the second vehicle-side communication unit so as to transmit the operation data stored in the vehicle-side storage unit via the short distance communication means.

Additionally, the present invention provides a mobile information terminal for receiving the operation data from the construction machine to transmit the operation data to the server, the mobile information terminal including: a first terminal-side communication unit having a function of communicating with the second vehicle-side communication unit of the construction machine via the short distance communication means; a second terminal-side communication unit having a function of transmitting the operation data to the server via the long distance communication means; and a terminal-side control unit which outputs a transmission start command for instructing transmission start of the operation data to the construction machine via the first terminal-side communication unit, and further determines whether the long distance communication means is available or not, and when determining that the long distance communication means is available, controls the second terminal-side communication unit so as to transmit, via the long distance communication means, the operation data received from the construction machine via the first terminal-side communication unit.

The present invention further provides an information communication system including: a server; the construction machine which has a function of communicating with the server via long distance communication means; and the mobile information terminal which has a function of communicating with the construction machine via short distance communication means for conducting communication in a distance shorter than a distance in the long distance communication means, and a function of communicating with the server via the long distance communication means.

The present invention provides a program to be implemented on a mobile information terminal for receiving the operation data from the construction machine to transmit the operation data to the server, in which the mobile information terminal includes: a first terminal-side communication unit having a function of communicating with the second vehicle-side communication unit of the construction machine via the short distance communication means; and a second terminal-side communication unit having a function of transmitting the operation data to the server via the long distance communication means, and in which the program causes the mobile information terminal to function as:

means for causing the first terminal-side communication unit to transmit a transmission start command to instruct transmission start of the operation data; means for determining whether the long distance communication means is available or not; and means for causing the second terminal-side communication unit to transmit the operation data received from the construction machine via the first terminal-side communication unit when determining that the long distance communication means is available.

The present invention enables execution of processing for accumulating operation data of a construction machine in a server in a condition where the construction machine is in operation in an area where communication means for transmitting operation data to the server is not available.

DESCRIPTION OF EMBODIMENTS

Embodiments of the present invention will be described below with reference to the accompanying drawings. The embodiments below are examples of implementation of the present invention and are not construed to limit a technical range of the present invention.

First Embodiment (FIG. 1 to FIG. 6)

Figure 1:
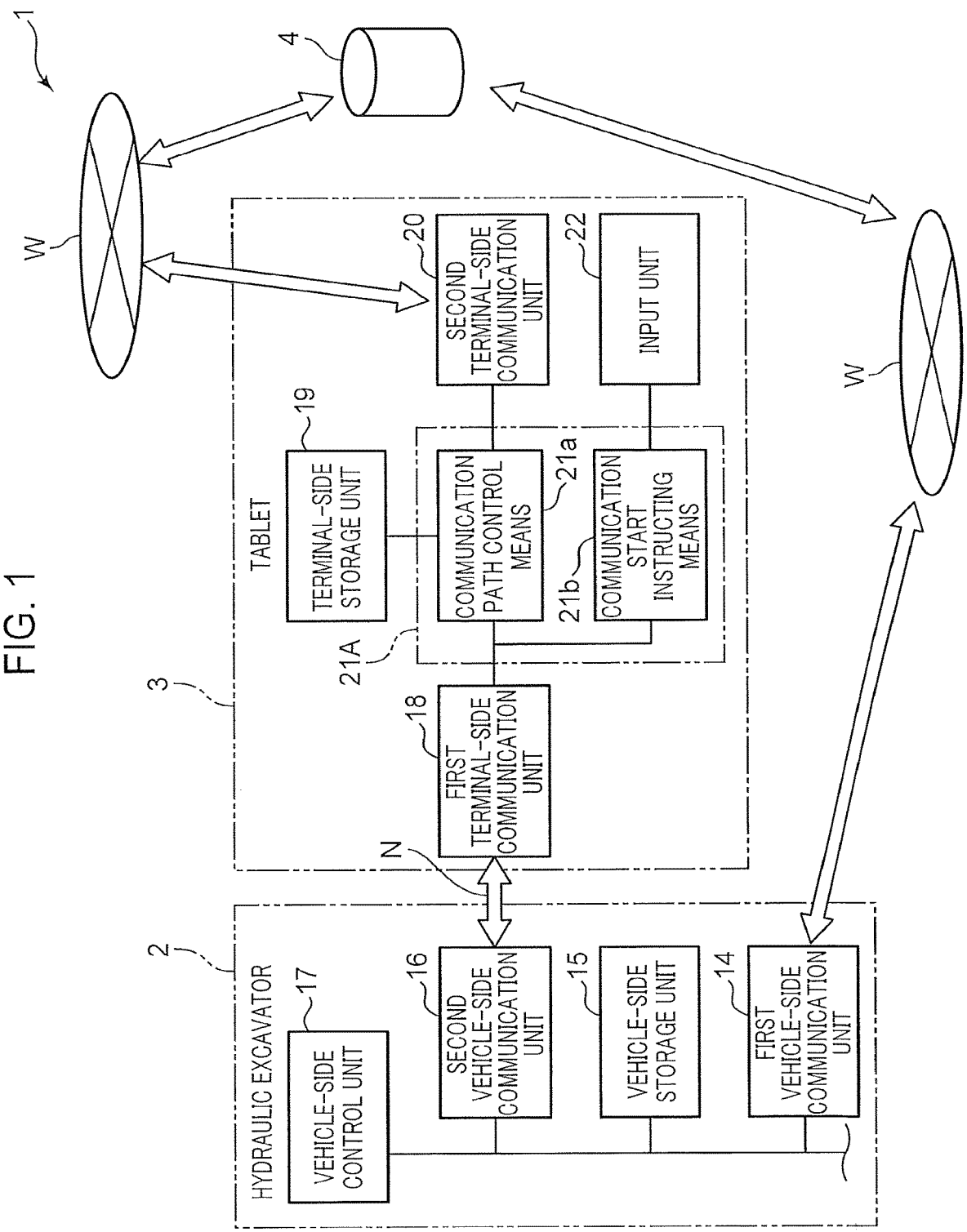
FIG. 1 is a block diagram showing an overall configuration of an information communication system according to a first embodiment of the present invention.

FIG. 1 is a schematic diagram showing an overall configuration of an information communication system 1 according to a first embodiment of the present invention.

With reference to FIG. 1, the information communication system 1 includes a hydraulic excavator 2 as one example of a construction machine, a tablet 3 as one example of a mobile information terminal, and a server 4.

Figure 2:
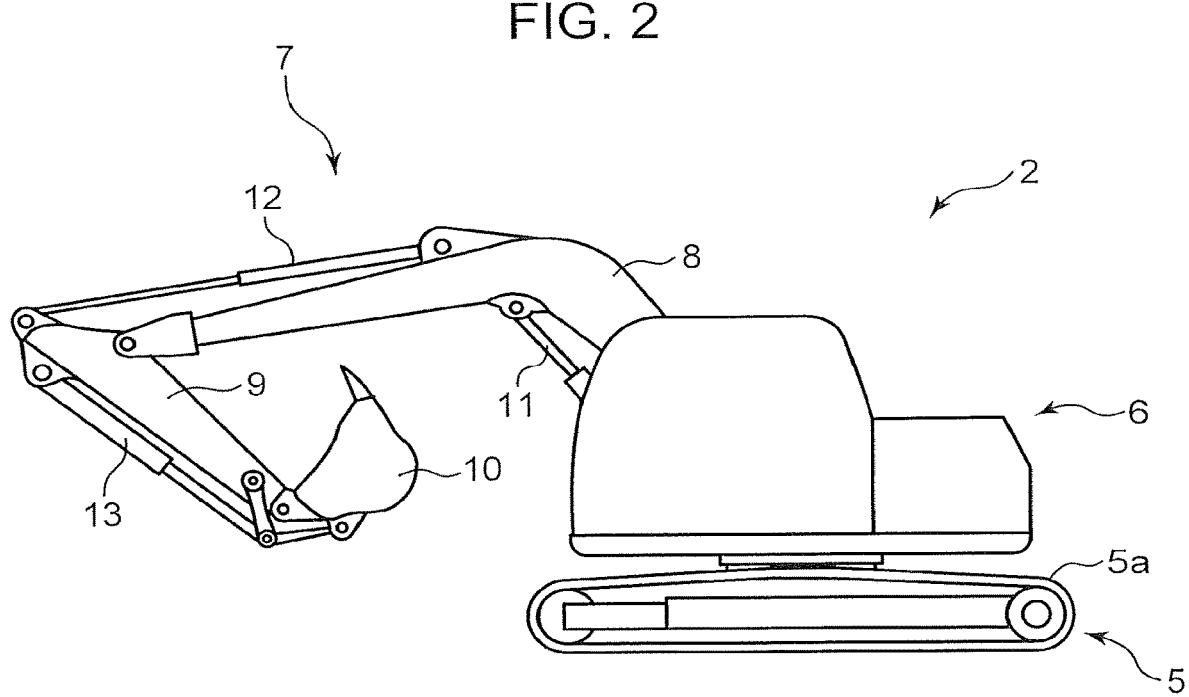
FIG. 2 is a side view showing an overall configuration of a hydraulic excavator in FIG. 1.

The hydraulic excavator 2 includes a lower travelling body 5 having a crawler 5a, an upper slewing body 6 provided to be turnable on the lower travelling body 5, and an attachment 7 rotatably attached to the upper slewing body 6 as shown in FIG. 2.

The attachment 7 has a boom 8 with a base end portion rotatably attached to the upper slewing body 6, an arm 9 with a base end portion rotatably attached to a distal end portion of the boom 8, and a bucket 10 rotatably attached to a distal end portion of the arm 9.

The attachment 7 further has a boom cylinder 11 causing the boom 8 to rotate with respect to the upper slewing body 6, an arm cylinder 12 causing the arm 9 to rotate with respect to the boom 8, and a bucket cylinder 13 causing the bucket 10 to rotate with respect to the arm 9.

Although not shown, the hydraulic excavator 2 has a hydraulic pump which supplies hydraulic oil to the cylinders 11 to 13, an engine which drives the hydraulic pump, a battery which supplies electric power to electric components, a sensor which detects an engine speed, and a sensor which detects a cooling water temperature of the engine.

Then, the hydraulic excavator 2 has a function of acquiring operation data including a battery voltage, an engine speed, cooling water temperature, and the like, and transmitting the same to the server 4 (see FIG. 1). In the following, this function will be described with reference to FIG. 1.

The hydraulic excavator 2 includes a first vehicle-side communication unit 14 having a function of transmitting operation data to the server via long distance communication means W such as a mobile phone line or the like, a second vehicle-side communication unit 16 having a function of communicating with the tablet 3 via short distance communication means N such as Bluetooth (registered trademark) or the like for conducting communication in a distance shorter than that of the long distance communication means, a vehicle-side storage unit 15 having a region for storing operation data, and a vehicle-side control unit 17 which controls both the vehicle-side communication units 14 and 16 and the vehicle-side storage unit 15.

The vehicle-side communication units 14 and 16 and the vehicle-side control unit 17 are functionally realized by combining configurations including a CPU, a ROM, and a RAM, and the vehicle-side storage unit 15 is configured with a non-volatile memory. Further, the vehicle-side communication units 14 and 16 each have an antenna for transmission and reception to/from the communication means W and N.

The vehicle-side control unit 17 acquires operation data when data collection time set in advance comes, as well as temporarily keeping the operation data. The vehicle-side control unit 17 also determines whether the long distance communication means W is available or not, and when determining that the long distance communication means W is available, controls the first vehicle-side communication unit 14 to transmit operation data to the server 4 via the long distance communication means W (the first vehicle-side communication unit 14). In a case where the long distance communication means W is available, when operation data, not limited to operation data temporarily kept in the vehicle-side control unit 17, is stored in the vehicle-side storage unit 15, the vehicle-side control unit 17 controls the first vehicle-side communication unit 14 to transmit the operation data as well to the server 4 via the long distance communication means W.

On the other hand, when determining that the long distance communication means W is not available, the vehicle-side control unit 17 causes the vehicle-side storage unit 15 to store operation data, while deleting temporarily kept operation data from the vehicle-side control unit 17. Then, the vehicle-side control unit 17 determines whether a transmission start command is issued from the tablet 3 to be described later or not, and when determining that the transmission start command has been issued, controls the second vehicle-side communication unit 16 to transmit the operation data stored in the vehicle-side storage unit 15 to the tablet 3 via the short distance communication means N (the second vehicle-side communication unit 16).

The vehicle-side control unit 17 also determines whether transmission of operation data to the server 4 normally ends or not, and when determining that the transmission normally ends, deletes the operation data from the vehicle-side storage unit 15 or the vehicle-side control unit 17.

The tablet 3 has a first terminal-side communication unit 18 having a function of communicating with the second vehicle-side communication unit 16 of the hydraulic excavator 2 via the short distance communication means N, a terminal-side storage unit 19 having a region for storing operation data received from the hydraulic excavator 2, a second terminal-side communication unit 20 having a function of transmitting operation data to the server 4 via the long distance communication means W, a terminal-side control unit 21A which controls both the terminal-side communication units 18 and 19, and an input unit 22 for inputting a command to the terminal-side control unit 21A.

The terminal-side communication units 18 and 20 and the terminal-side control unit 21A are functionally realized by combining configurations including a CPU, a ROM, and a RAM, and the terminal-side storage unit 19 is configured with a non-volatile memory. Further, the terminal-side communication units 18 and 20 each have an antenna for transmission and reception to/from the communication means W and N.

The first terminal-side communication unit 18 temporarily keeps operation data received from the second vehicle-side communication unit 16 of the hydraulic excavator 2.

The input unit 22 is configured with a touch panel (not shown) provided on the tablet 3. Specifically, the input unit 22 is capable of inputting, to the terminal-side control unit 21A, a command for instructing to output a transmission start command to instruct start of operation data transmission.

The terminal-side control unit 21A has communication start instructing means 21b which outputs, to the first terminal-side communication unit 18, a command for outputting a transmission start command to the hydraulic excavator 2 via the first terminal-side communication unit 18 in response to a command from the input unit 22, and communication path control means 21a which controls a communication path of operation data received via the first terminal-side communication unit 18.

When receiving operation data from the second vehicle-side communication unit 16 of the hydraulic excavator 2, the communication path control means 21a causes the first terminal-side communication unit 18 to temporarily keep the operation data. The communication path control means 21a also determines whether the long distance communication means W is available or not, and when determining that the long distance communication means W is available, controls the second terminal-side communication unit 20 so as to transmit the operation data received from the hydraulic excavator 2 to the server 4 via the long distance communication means W (the second terminal-side communication unit 20). In a case where the long distance communication means W is available, when operation data, not limited to operation data temporarily kept in the first terminal-side communication unit 18, is stored in the terminal-side storage unit 19, the communication path control means 21a controls the second terminal-side communication unit 20 to transmit the operation data as well to the server 4 via the long distance communication means W.

On the other hand, when determining that the long distance communication means W is not available, the communication path control means 21a causes the terminal-side storage unit 19 to store operation data received from the hydraulic excavator 2, while deleting the temporarily kept operation data from the first terminal-side communication unit 18.

The communication path control means 21a also determines whether transmission of operation data to the server 4 normally ends or not, and when determining that the transmission normally ends, deletes the operation data from the terminal-side storage unit 19 or the first terminal-side communication unit 18.

As described in the foregoing, the tablet 3 has a program implemented thereon for causing the tablet 3 to function as the communication path control means 21a and the communication start instructing means 21b.

In the following, description will be made of processing to be executed by the vehicle-side control unit 17 of the hydraulic excavator 2 with reference to FIG. 1, FIG. 3, and FIG. 4.

When the processing is started, first, determination is made whether data collection time set in advance for collecting operation data arrives or not (Step S1).

When the determination is made in Step S1 that the data collection time arrives, operation data is collected and is also temporarily kept in the vehicle-side control unit 17 (Step S2).

When the determination is made to be NO in Step S1, or when Step S2 is executed, determination is made whether communication with the server 4 is allowed or not, i.e., whether the long distance communication means W is available or not (Step S3).

Here, when the determination is made that the long distance communication means W is available, determination is made whether operation data is temporarily kept in the vehicle-side control unit 17 or not (Step S9), and when determining that operation data is temporarily kept, the operation data is transmitted to the server 4 via the first vehicle-side communication unit 14 (the long distance communication means W) (Step S10).

Next, determination is made whether transmission (transfer) of operation data to the server 4 normally ends or not (Step S11). Specifically, in a case, for example, where the vehicle-side control unit 17 transmits operation data while checking an amount of data already received by the server 4, determination is made whether reception of all the amount of operation data is confirmed or not.

Here, when the determination is made that transmission to the server 4 abnormally ends, operation data is stored in the vehicle-side storage unit 15, while the operation data in the vehicle-side control unit 17 is deleted (Step S12).

On the other hand, when the determination is made that transmission to the server 4 normally ends, the operation data in the vehicle-side control unit 17 is deleted (Step S13).

In a case of determination of NO in Step S9, when Step S12 or Step S13 is executed, determination is subsequently made whether operation data is stored in the vehicle-side storage unit 15 or not (Step S14).

Here, when the determination is made that operation data is stored in the vehicle-side storage unit 15, the operation data stored in the vehicle-side storage unit 15 is transmitted to the server 4 via the first vehicle-side communication unit 14 (the long distance communication means W (Step S15).

Next, similarly to the above-described Step S11, determination is made whether the transmission (transfer) of the operation data to the server 4 normally ends or not (Step S16).

Figure 3:
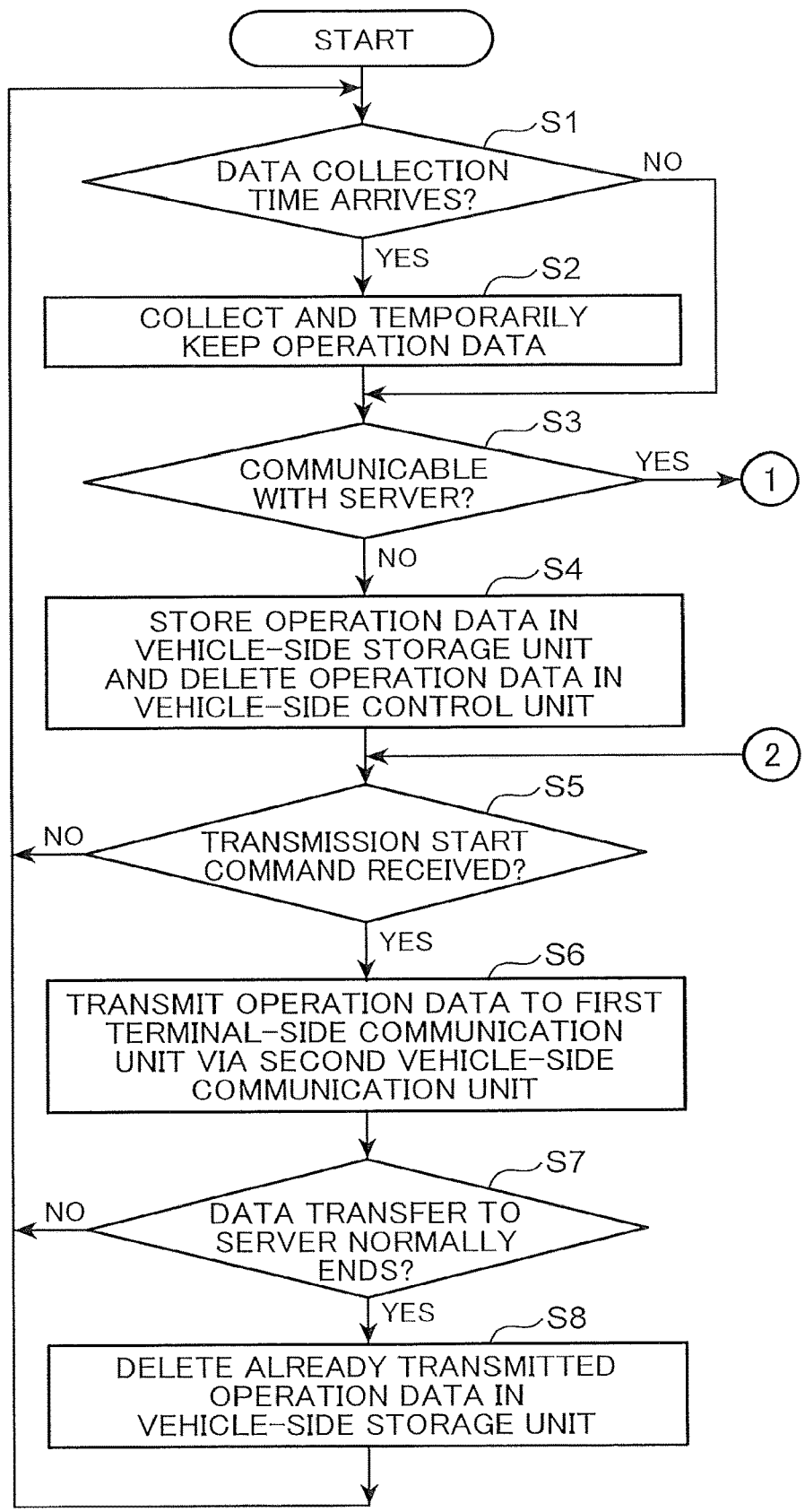
FIG. 3 is a flow chart showing a part of processing to be executed by a vehicle-side control unit in FIG. 1.
Figure 4:
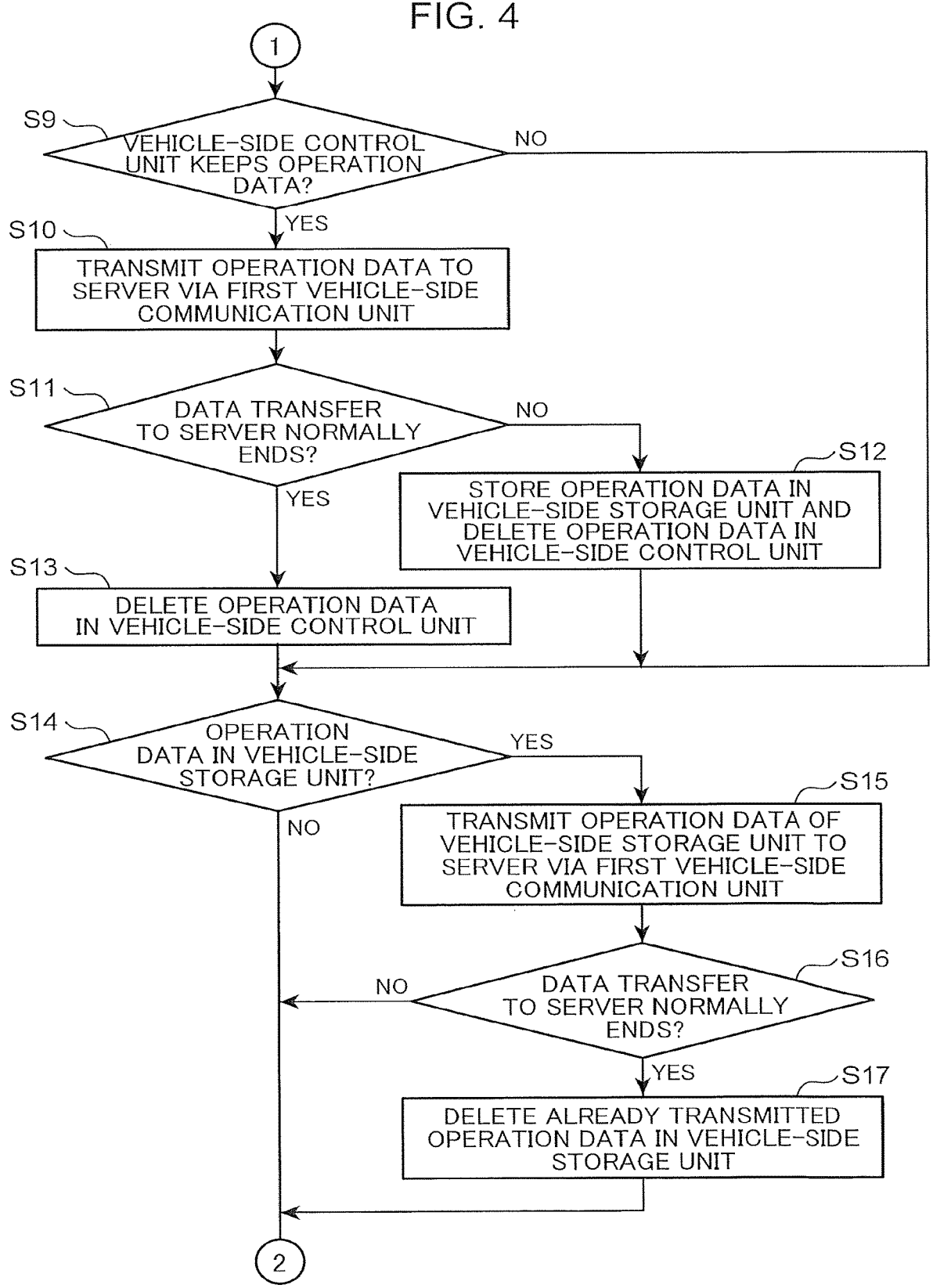
FIG. 4 is a flow chart showing a subsequent part of the processing in FIG. 3.

Here, when the determination is made that the transmission of the operation data to the server 4 normally ends, the already transmitted operation data in the vehicle-side storage unit 15 is deleted (Step S17) to execute Step S5 shown in FIG. 3.

On the other hand, when the determination is made to be NO in Step S14, or when the determination is made to be NO in Step S16, Step S5 shown in FIG. 3 is executed without deleting the operation data in the vehicle-side storage unit 15 (Step S17).

The foregoing processing is processing to be executed when the determination is made in Step S3 that the long distance communication means W is available.

On the other hand, the processing in Step S4 and the following steps in FIG. 3 is processing to be executed when the determination is made that the long distance communication means W is not available.

Specifically, when the determination is made to be NO in the above Step S3, operation data is stored in the vehicle-side storage unit 15, while operation data temporarily kept in the vehicle-side control unit 17 is deleted (Step S4).

In a state where Step S4 is executed, the hydraulic excavator 2 has no means for transmitting operation data to the server 4. The vehicle-side control unit 17 therefore waits for input of a transmission start command from the tablet 3 (Step S5).

On the other hand, there is a case where an owner of the tablet 3 (e.g., a manager of the hydraulic excavator 2) visits a place of the hydraulic excavator 2 for maintenance or the like of the hydraulic excavator 2. In this state, the following processing is executed between the hydraulic excavator 2 and the tablet 3.

Figure 5:
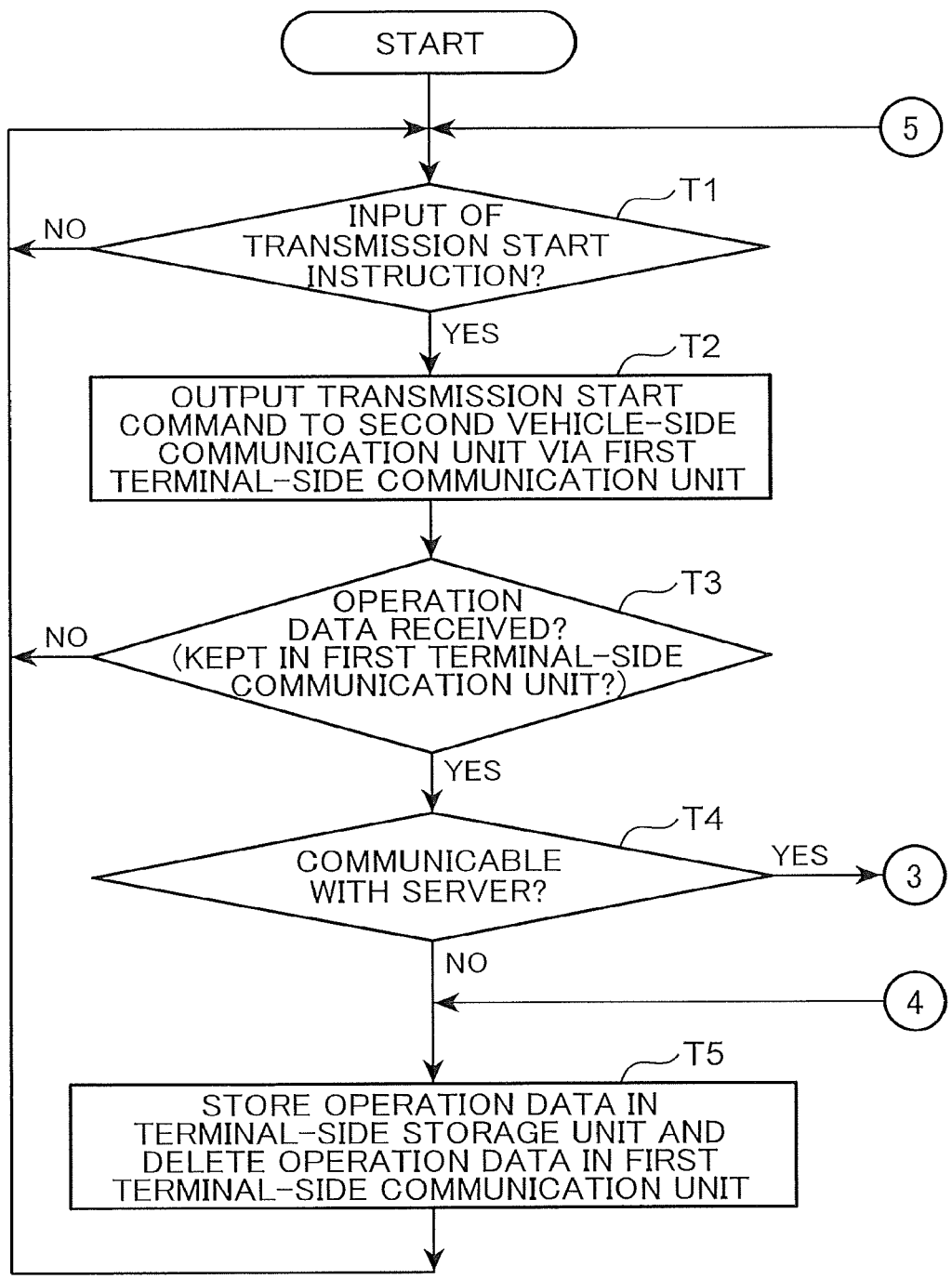
FIG. 5 is a flow chart showing a part of processing to be executed by a terminal-side control unit in FIG. 1.
Figure 6:
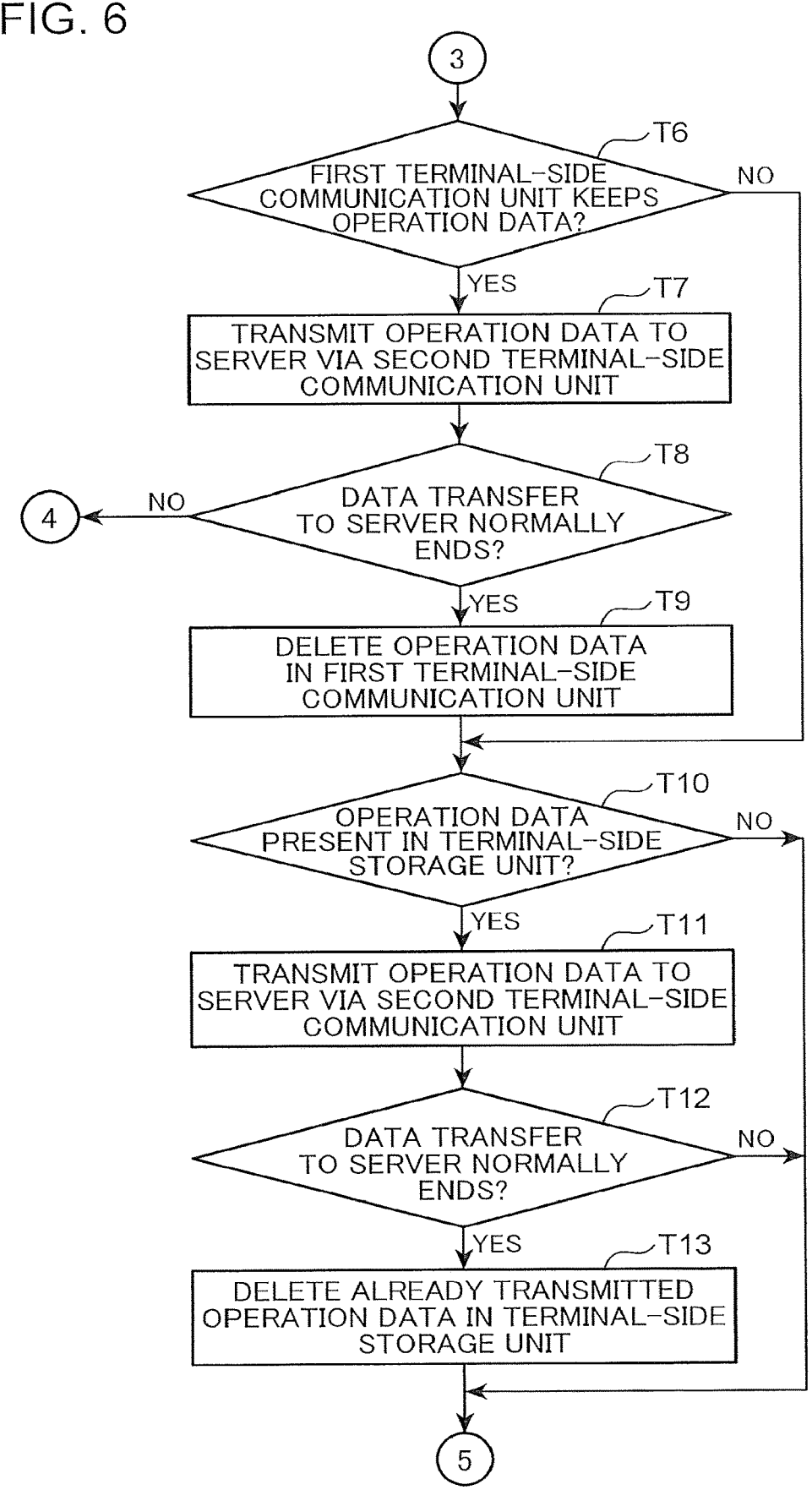
FIG. 6 is a flow chart showing a subsequent part of the processing in FIG. 5.

FIG. 5 and FIG. 6 are flow charts showing processing to be executed by the terminal-side control unit 21A of the tablet 3. Hereinafter, the processing to be executed between the hydraulic excavator 2 and the tablet 3 will be described with reference to FIG. 1, FIG. 3, FIG. 5, and FIG. 6.

First, as shown in FIG. 5, input of a transmission start instruction by the input unit 22 in the tablet 3 is waited for (Step T1).

When the determination is made in Step T1 that the transmission start instruction is input in the tablet 3, a transmission start command is output to the second vehicle-side communication unit of the hydraulic excavator 2 via the first terminal-side communication unit 18 (the short distance communication means N) (Step T2).

In response to the command, the determination is made, in the hydraulic excavator 2, to be YES in Step S5 shown in FIG. 3, so that the operation data stored in the vehicle-side storage unit 15 is transmitted to the first terminal-side communication unit 18 of the tablet 3 via the second vehicle-side communication unit 16 (the short distance communication means N) (Step S6).

Next, determination is made whether transmission (transfer) of operation data to the tablet 3 normally ends or not (Step S7). Specifically, in a case, for example, where the vehicle-side control unit 17 transmits operation data while checking an amount of data already received by the tablet 3, determination is made whether reception of all the amount of operation data is confirmed or not.

When the determination is made in Step S7 that operation data transmission normally ends, the operation data in the vehicle-side storage unit 15 is deleted (Step S8) to return to Step S1.

On the other hand, when the determination is made in Step S7 that transmission of operation data is yet to end, the processing returns to Step S1 without executing Step S8 (with the operation data remaining in the vehicle-side storage unit 15).

When transmission (transfer) of operation data from the hydraulic excavator 2 to the tablet 3 is started as in the above Step S6, processing in Step T3 and the following steps shown in FIG. 5 is executed in the tablet 3.

In Step T3, determination is made whether reception of operation data is completed or not, i.e., whether the operation data is temporarily kept in the first terminal-side communication unit 18 or not. Specifically, in Step T3, for example, data related to an amount of data scheduled to be transmitted and operation data are transmitted from the hydraulic excavator 2 to determine whether operation data already received by the tablet 3 corresponds to the amount of data scheduled to be transmitted or not.

When the determination is made in Step T3 that the reception of the operation data is not completed, the above Step T1 and Step T2 are repeatedly executed.

On the other hand, when the determination is made in Step T3 that the reception of the operation data is completed, determination is made whether the tablet 3 is communicable with the server 4 or not, i.e., whether the long distance communication means W is available or not (Step T4).

When the determination is made in Step T4 that the long distance communication means W is not available, operation data is stored in the terminal-side storage unit 19, while the operation data temporarily kept in the first terminal-side communication unit 18 is deleted (Step T5) to return to Step T1.

On the other hand, when the determination is made in Step T4 that the long distance communication means W is available, determination is made whether operation data is temporarily kept in the first terminal-side communication unit 18 or not (Step T6).

Here, when the determination is made that operation data is temporarily kept in the first terminal-side communication unit 18, the operation data is transmitted to the server 4 via the second terminal-side communication unit 20 (the long distance communication means W) (Step T7).

Next, determination is made whether transmission (transfer) of operation data to the server 4 normally ends or not (Step T8). Specifically, in a case, for example, where the terminal-side control unit 21A transmits operation data while checking an amount of data already received by the server 4, determination is made whether reception of all the amount of operation data is confirmed or not.

Here, when the determination is made that transmission of operation data to the server 4 is yet to normally end, the above Step T5 is executed, and on the other hand, when the determination is made that transmission of operation data to the server 4 normally ends, operation data temporarily kept in the first terminal-side communication unit 20 is deleted (Step T9).

When the determination is made in the above Step T6 that the first terminal-side communication unit 20 does not temporarily keep operation data, or when Step T9 is executed, determination is next made whether operation data is stored in the terminal-side storage unit 19 or not (Step T10).

When the determination is made in Step T10 that operation data is stored in the terminal-side storage unit 19, the operation data is transmitted to the server 4 via the second terminal-side communication unit 20 (the long distance communication means W)(Step T11).

Next, similarly to the above-described Step T8, determination is made whether transmission (transfer) of operation data to the server 4 normally ends or not (Step T12).

When the determination is made in Step T12 that transmission of operation data to the server 4 normally ends, the operation data stored in the terminal-side storage unit 19 is deleted (Step T13) to return to the above-described Step T1.

On the other hand, when the determination is made in Step T10 that no operation data is stored in the terminal-side storage unit 19, or the determination is made in Step T12 that transmission of operation data to the server 4 is yet to normally end, the processing returns to Step T1 without deleting the operation data stored in the terminal-side storage unit 19 (without conducting Step T13).

As described in the foregoing, when the determinations are made that the long distance communication means W is not available and that a transmission start command is received from the tablet 3, operation data stored in the vehicle-side storage unit 15 can be transmitted to the tablet 3 via the short distance communication means N.

At such a stage where the transmission of operation data is executed as described above, it is highly probable that also in the tablet 3, communication via the long distance communication means W is limited. However, the operation data can be transmitted from the tablet 3 to the server 4 at a stage where the tablet 3 is moved to an area where the long distance communication means W is available.

Accordingly, in a condition where the hydraulic excavator 2 is in operation in an area where the long distance communication means W is not available, processing can be executed for accumulating the operation data of the hydraulic excavator 2 in the server 4.

Additionally, the first embodiment produces the following advantageous effects.

Since the operation data is deleted from the vehicle-side storage unit 15 when operation data stored in the vehicle-side storage unit 15 is normally transmitted to the server 4, a shortage of a storage region in the vehicle-side storage unit 15 by leaving the operation data transmitted to the server 4 in the vehicle-side storage unit 15 can be suppressed.

Since operation information in the server 4 can be updated at a stage where the long distance communication means W becomes available even when no transmission start command is issued from the tablet 3 for a long period of time, accurate management of the hydraulic excavator 2 is possible.

It is possible to once store operation data in the terminal-side storage unit 19 in a condition where the long distance communication means W is not available, and then transmit the operation data to the server 4 after the long distance communication means W becomes available.

Since the operation data is deleted from the terminal-side storage unit 19 when operation data stored in the terminal-side storage unit 19 is normally transmitted to the server 4, a shortage of a storage region in the terminal-side storage unit 19 by leaving the operation data transmitted to the server 4 in the terminal-side storage unit 19 can be suppressed.

In a state where an owner of the tablet 3 approaches the hydraulic excavator 2 to a region in which communication with the second vehicle-side communication unit 16 of the hydraulic excavator 2 is allowed, the owner can output a transmission start command to the hydraulic excavator 2 through the input unit 22. This enables execution of operation data transmission to the tablet 3 from the hydraulic excavator 2 located in an area in which the long distance communication means W is not available.

Figure 7:
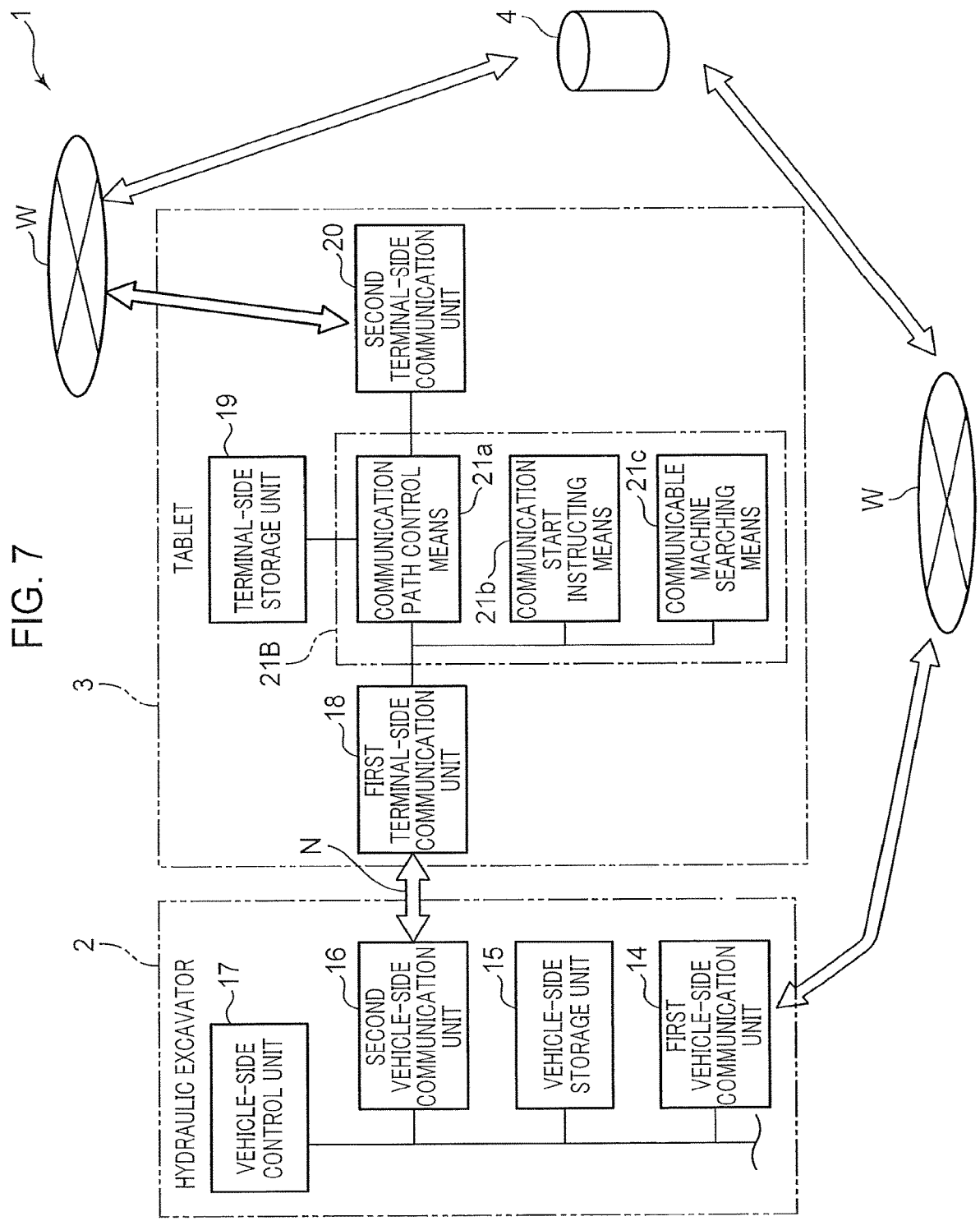
FIG. 7 is a block diagram showing an overall configuration of an information communication system according to a second embodiment of the present invention.
Figure 8:
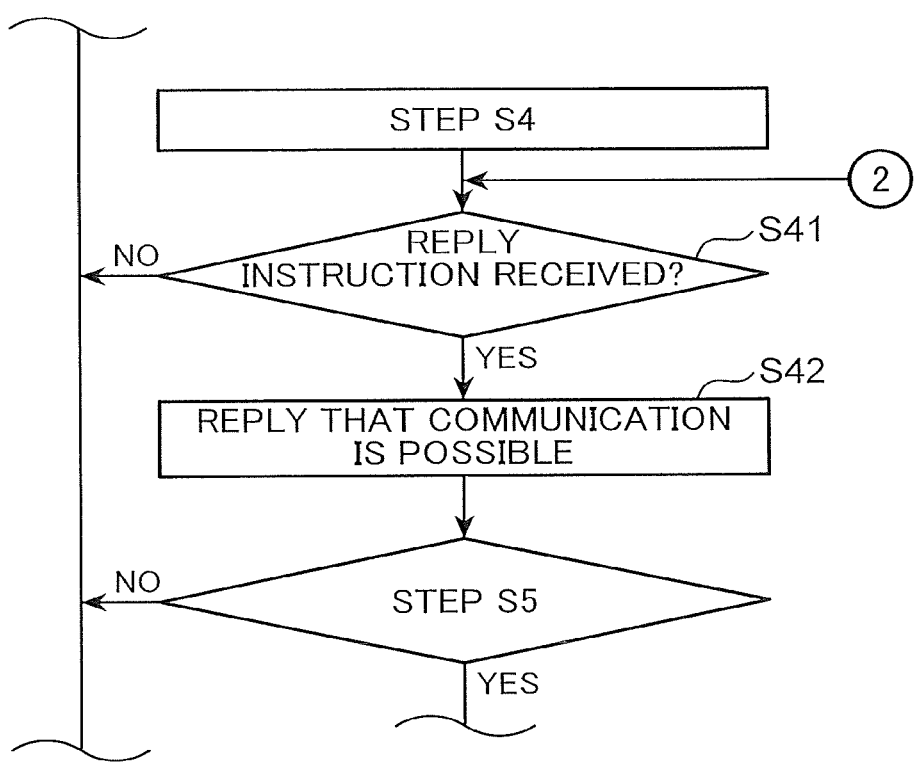
FIG. 8 is a flow chart showing a part of processing to be executed by a vehicle-side control unit in FIG. 7.
Figure 9:
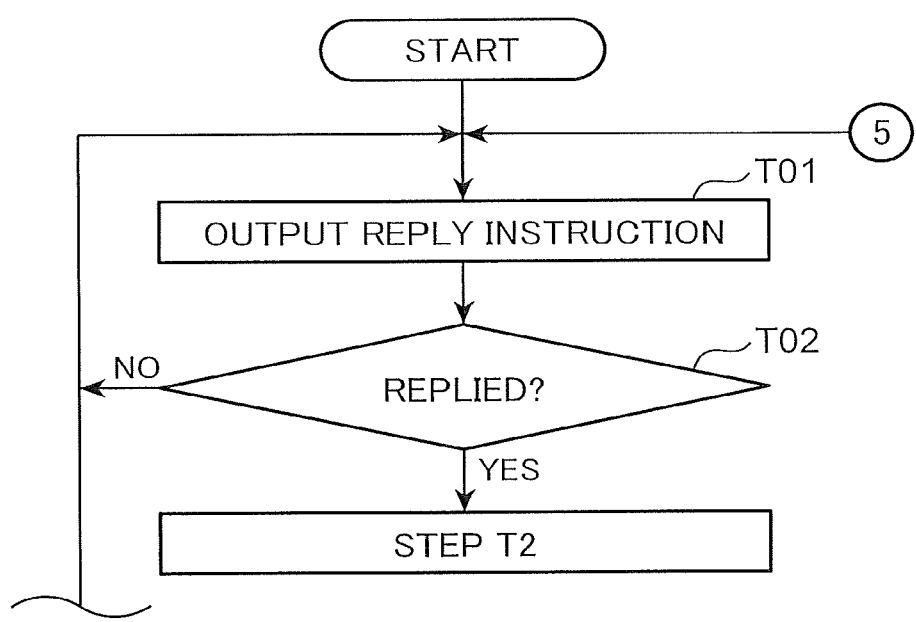
FIG. 9 is a flow chart showing a part of processing to be executed by a terminal-side control unit in FIG. 7.

Second Embodiment (FIG. 7 to FIG. 9)

In the first embodiment, when a transmission start instruction is input from the input unit 22 (YES in Step T1), a transmission start command is transmitted from the tablet 3 to the hydraulic excavator 2. However, a chance of transmission of a transmission start command is not limited to input by the input unit 22.

In a second embodiment to be described below, when a communication allowable condition set in advance, which indicates that the second vehicle-side communication unit 16 of the hydraulic excavator 2 and the first terminal-side communication unit 18 of the tablet 3 are communicable, is satisfied, a transmission start command is transmitted from the tablet 3 to the hydraulic excavator 2.

FIG. 7 is a schematic diagram showing an overall configuration of an information communication system 1 according to the second embodiment. Components having the similar configurations as those of the first embodiment are given the same reference numerals to omit description thereof.

A tablet 3 according to the second embodiment has a terminal-side control unit 21B in place of the terminal-side control unit 21A, and does not have the input unit 22.

The terminal-side control unit 21B has communication path control means 21a, communication start instructing means 21b, and communicable machine searching means 21c.

The communicable machine searching means 21c outputs, to a first terminal-side communication unit 18, a command to output, to a hydraulic excavator 2, information for instructing the hydraulic excavator 2 to reply.

The communication start instructing means 21b outputs, to the first terminal-side communication unit 18, a command to output, to the hydraulic excavator 2, a transmission start command upon reception of a reply from the hydraulic excavator 2 (when a communication allowable condition is satisfied).

As described in the foregoing, the tablet 3 has a program implemented thereon for causing the tablet 3 to function as the communication path control means 21a, the communication start instructing means 21b, and the communicable machine searching means 21c.

On the other hand, a vehicle-side control unit 17 of the hydraulic excavator 2 outputs, to a second vehicle-side communication unit 16, a command to return information indicative of communicability to the tablet 3 upon receiving, from the tablet 3, information for instructing to reply.

As shown in FIG. 9, when processing by the terminal-side control unit 21B is started in the tablet 3, Step T01 is executed in place of Step T1 of the first embodiment. In Step T01, information instructing to reply is output to the hydraulic excavator 2 from the communicable machine searching means 21c via the first terminal-side communication unit 18.

Figure 10:
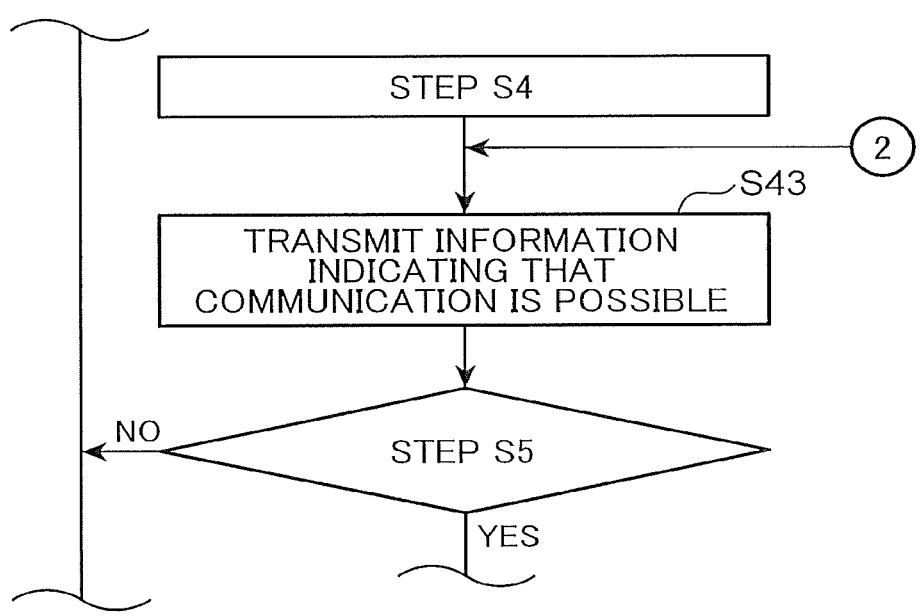
FIG. 10 is a flow chart showing a part of processing to be executed by a vehicle-side control unit according to a third embodiment of the present invention.

On the other hand, as shown in FIG. 10, in the processing by the vehicle-side control unit 17 of the hydraulic excavator 2, determination is made whether information instructing to reply is received from the tablet 3 after the above-described Step S4 or not (Step S41).

When the determination is made to be NO in Step S41, the above-described Step S1 is repeatedly executed.

On the other hand, when the determination is made in Step S41 that a reply instruction is received from the tablet 3, information indicative of communicability is returned to the tablet 3 (Step S42) to wait for a transmission start command in subsequent Step S5.

Meanwhile, in the tablet 3, determination is made whether a reply from the hydraulic excavator 2 is received after the above Step T01 or not (Step T02).

When the determination is made that no replay is received from the hydraulic excavator 2, a reply instruction is repeatedly output in Step T01. On the other hand, when determination is made that a reply is received from the hydraulic excavator 2, a transmission start command is output in the above-described Step T2. As a result, transmission (transfer) of operation data from the hydraulic excavator 2 to the tablet 3 is started.

As described in the foregoing, according to the second embodiment, when an owner of the tablet 3 approaches the hydraulic excavator 2 to a region in which communication with the second vehicle-side communication unit 16 is allowed, the communication allowable condition is satisfied, and a transmission start command is automatically output to the hydraulic excavator 2. This enables execution of operation data transmission to the tablet 3 from the hydraulic excavator 2 located in an area in which the long distance communication means W is not available.

Figure 11:
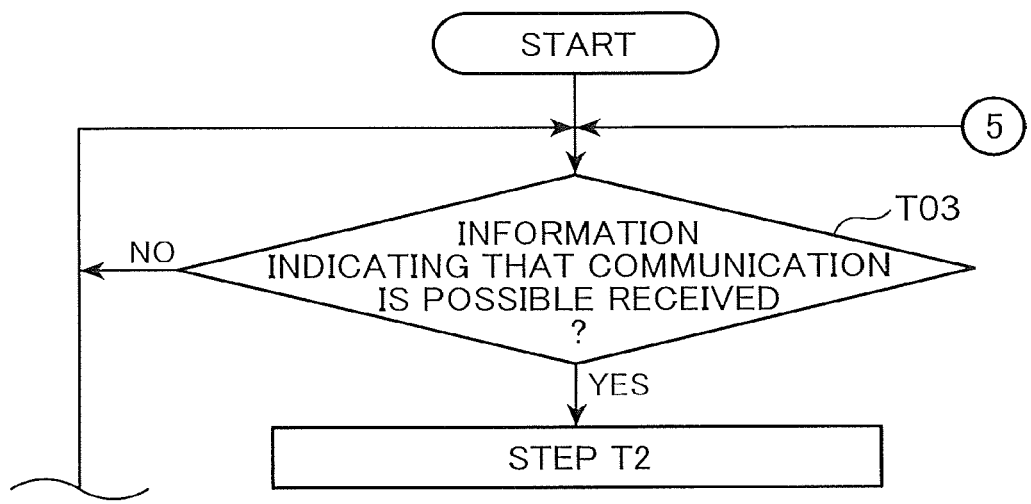
FIG. 11 is a flow chart showing a part of processing to be executed by a terminal-side control unit according to the third embodiment of the present invention.

Third Embodiment (FIG. 10 and FIG. 11)

In the second embodiment, the tablet 3 outputs a reply command, and upon reply from the hydraulic excavator 2, the determination is made that a communication allowable condition is satisfied, so that a transmission start command is output from the tablet 3. However, determination whether a communication allowable condition is satisfied or not is not limited to the determination according to the second embodiment.

In an information communication system 1 according to a third embodiment, information to the effect that communication is possible is transmitted from a hydraulic excavator 2, and upon reception of the information by a tablet 3, determination is made that a communication allowable condition is satisfied to output a transmission start command from the tablet 3. Hereinafter, description will be made only of points different from the second embodiment.

In processing of the hydraulic excavator 2, a vehicle-side control unit 17 outputs information to the effect that communication is possible to the tablet 3 via a second vehicle-side communication unit 16 after the above-described Step S4 (Step S43).

Communicable machine searching means 21c of the tablet 3 responsively determines whether the information to the effect that communication is possible is received from the hydraulic excavator 2 or not, in place of the above-described Step T01 and Step T02 (Step T03).

When the determination is made in Step T03 that the information to the effect that communication is possible is not received, Step T03 is repeatedly executed. On the other hand, when the determination is made that the information to the effect that communication is possible is received, a transmission start command is output in the above-described Step T2.

The present invention is not limited to the above embodiments, but can adopt, for example, the following modes.

While Bluetooth (registered trademark) has been described as one example of the short distance communication means N, the short distance communication means N is not limited to means by radio communication but may be means for realizing communication by wire set up by physically connecting the hydraulic excavator 2 and the tablet 3 (e.g., connection via a communication line).

While the example where the tablet 3 and the server 4 are connected via the long distance communication means W has been described, the tablet 3 and the server 4 may be physically connected (e.g., may be connected via, for example, a communication line).

While the example where operation data already transmitted to the server 4 is deleted from the vehicle-side storage unit 15 and the terminal-side storage unit 19 has been described in the above embodiments, operation data already transmitted to the server 4 may be left in the vehicle-side storage unit 15 and the terminal-side storage unit 19 as backup.

While in the above embodiment, operation data stored in the vehicle-side storage unit 15 is transmitted to the server 4 via the tablet 3, or directly via the long distance communication means W, the operation data stored in the vehicle-side storage unit 15 may be transferred to the server 4 via the tablet 3 without fail.

The construction machine is not limited to the hydraulic excavator 2, but may be a crane and a demolition machine, or a hybrid construction machine.

The mobile information terminal is not limited to the tablet 3, but may be a smart phone, a notebook computer, or the like.

Additionally, at least two of the first to third embodiments can be combined.

The above-described specific embodiments mainly include the inventions having the following configurations.

In order to solve the above problem, the present invention provides a construction machine capable of collecting operation data and transmitting the operation data to a server via long distance communication means, the construction machine including: a first vehicle-side communication unit having a function of transmitting the operation data to the server via the long distance communication means; a second vehicle-side communication unit having a function of communicating with a mobile information terminal via short distance communication means for conducting communication in a distance shorter than a distance in the long distance communication means; a vehicle-side storage unit having a region for storing the operation data; and a vehicle-side control unit which determines whether the long distance communication means is available or not, when determining that the long distance communication means is available, controls the first vehicle-side communication unit so as to transmit the operation data via the long distance communication means, and when determining that the long distance communication means is not available, causes the vehicle-side storage unit to store the operation data, and further determines whether a transmission start command is received from the mobile information terminal or not, and when determining that the transmission start command is received, controls the second vehicle-side communication unit so as to transmit the operation data stored in the vehicle-side storage unit via the short distance communication means.

With the construction machine according to the present invention, when determination is made that the long distance communication means is not available and determination is made that a transmission start command is received from the mobile information terminal, operation data stored in the vehicle-side storage unit can be transmitted to the mobile information terminal via the short distance communication means.

Although at such a stage where the transmission of operation data is executed as described above, it is highly probable that also in the mobile information terminal, communication via the long distance communication means is limited, the operation data can be transmitted from the mobile information terminal to the server at a stage where the mobile information terminal is moved to an area where the long distance communication means is available. Connecting the mobile information terminal and the server by a communication line also enables transmission of the operation data to the server.

Accordingly, in a condition where the construction machine according to the present invention is in operation in an area where the long distance communication means is not available, processing can be executed for accumulating the operation data of the construction machine in the server.

In the present invention, "short distance" represents that a distance to a direct communication destination (e.g., a communication satellite, a base station, a mobile information terminal, or the like) of a construction machine is short.

Here, although it is also possible to leave, in the vehicle-side storage unit, operation data already transmitted to the server as backup, in this case, accumulation of the operation data in the vehicle-side storage unit might cause a shortage of a storage region in the vehicle-side storage unit.

Therefore, in the construction machine, the vehicle-side control unit preferably determines whether transmission of the operation data stored in the vehicle-side storage unit to the server normally ends or not, and when determining that the transmission normally ends, deletes the operation data stored in the vehicle-side storage unit from the vehicle-side storage unit.

Since in this mode, when operation data stored in the vehicle-side storage unit is normally transmitted to the server, the operation data is deleted from the vehicle-side storage unit, a shortage of a storage region in the vehicle-side storage unit by leaving the operation data transmitted to the server in the vehicle-side storage unit can be suppressed.

Here, although the operation data stored in the vehicle-side storage unit can be transmitted to the server via the mobile information terminal without fail, when no transmission start command is issued from the mobile information terminal for a long period of time, operation data in the server is not updated for a long period of time, making it difficult to accurately manage the construction machine.

Therefore, in the construction machine, when determining that the long distance communication means is available, the vehicle-side control unit preferably determines whether the operation data is stored in the vehicle-side storage unit or not, and when determining that the operation data is stored in the vehicle-side storage unit, controls the first vehicle-side communication unit so as to transmit the operation data stored in the vehicle-side storage unit via the long distance communication means.

Since in this mode, even when no transmission start command is received from the mobile information terminal for a long period of time, operation information in the server can be updated upon entering a state where the long distance communication means becomes available, the construction machine can be accurately managed.

Additionally, the present invention provides a mobile information terminal for receiving the operation data from the construction machine to transmit the operation data to the server, the mobile information terminal including: a first terminal-side communication unit having a function of communicating with the second vehicle-side communication unit of the construction machine via the short distance communication means; a second terminal-side communication unit having a function of transmitting the operation data to the server via the long distance communication means; and a terminal-side control unit which outputs a transmission start command for instructing transmission start of the operation data to the construction machine via the first terminal-side communication unit, and further determines whether the long distance communication means is available or not, and when determining that the long distance communication means is available, controls the second terminal-side communication unit so as to transmit, via the long distance communication means, the operation data received from the construction machine via the first terminal-side communication unit.

With the mobile information terminal according to the present invention, since a transmission start command can be output to the construction machine, operation data can be received from the construction machine when the construction machine is present in an area where the long distance communication means is not available.

Further, when the long distance communication means is available, operation data received from the construction machine can be transmitted to the server via the long distance communication means.

Accordingly, the mobile information terminal according to the present invention enables execution of processing for accumulating operation data of a construction machine in a server in a condition where the construction machine is in operation in an area where the long distance communication means is not available.

The mobile information terminal preferably further includes a terminal-side storage unit having a region for storing the operation data, in which the terminal-side control unit, when determining that the long distance communication means is not available, causes the terminal-side storage unit to store the operation data received from the construction machine.

In this mode, in a condition where the long distance communication means is not available, operation data can be once stored in the terminal-side storage unit and then, when the long distance communication means becomes available, the operation data can be transmitted to the server.

Here, although it is also possible to leave, in the terminal-side storage unit, operation data already transmitted to the server as backup, in this case, accumulation of the operation data in the terminal-side storage unit might cause a shortage of a storage region in the vehicle-side storage unit.

Therefore, in the mobile information terminal, the terminal-side control unit preferably determines whether transmission of the operation data stored in the terminal-side storage unit to the server normally ends or not, and when determining that the transmission normally ends, deletes the operation data stored in the terminal-side storage unit from the terminal-side storage unit.

Since in this mode, when operation data stored in the terminal-side storage unit is normally transmitted to the server, the operation data is deleted from the terminal-side storage unit, a shortage of a storage region in the terminal-side storage unit by leaving the operation data transmitted to the server in the terminal-side storage unit can be suppressed.

The mobile information terminal preferably further includes an input unit for inputting, to the terminal-side control unit, a command to output the transmission start command.

Since in this mode, in a state where an owner of the mobile information terminal approaches the construction machine to a region in which communication with the second vehicle-side communication unit of the construction machine is allowed, the owner can output a transmission start command to the construction machine through the input unit. This enables execution of transmission of operation data from a construction machine to a mobile information terminal, the construction machine being located in an area where long distance communication means is not available.

Also in the mobile information terminal, the terminal-side control unit can be configured to control the first terminal-side communication unit so as to transmit the transmission start command to the construction machine when a communication allowable condition is satisfied, the condition being set in advance to indicate that the second vehicle-side communication unit of the construction machine and the first terminal-side communication unit are communicable.

Since in this mode, when an owner of the mobile information terminal approaches the construction machine to a region in which communication with the second vehicle-side communication unit is allowed, a communication allowable condition is satisfied to automatically output a transmission start command to the construction machine. This enables execution of transmission of operation data from a construction machine to a mobile information terminal, the construction machine being located in an area where the long distance communication means is not available.

The present invention further provides an information communication system including: a server; the construction machine which has a function of communicating with the server via long distance communication means; and the mobile information terminal which has a function of communicating with the construction machine via short distance communication means for conducting communication in a distance shorter than a distance in the long distance communication means, and a function of communicating with the server via the long distance communication means.

In a case where a construction machine is present in an area where long distance communication means is not available, the information communication system according to the present invention enables transmission of operation data from the construction machine to a mobile information terminal when an owner of the mobile information terminal approaches the construction machine to a position at which communication with the construction machine is allowed via short distance communication means.

Further, when the owner of the mobile information terminal is located in an area where the long distance communication means is available, operation data received from the construction machine can be transmitted from the mobile information terminal to the server via the long distance communication means.

Accordingly, in a condition where a construction machine is in operation in an area where communication means for transmitting operation data to a server is not available, the information communication system according to the present invention enables execution of processing for accumulating operation data of the construction machine in the server.

The present invention also provides a program to be implemented on a mobile information terminal for receiving the operation data from the construction machine to transmit the operation data to the server, in which the mobile information terminal includes: a first terminal-side communication unit having a function of communicating with the second vehicle-side communication unit of the construction machine via the short distance communication means; and a second terminal-side communication unit having a function of transmitting the operation data to the server via the long distance communication means, and in which the program causes the mobile information terminal to function as means for causing the first terminal-side communication unit to transmit a transmission start command to instruct transmission start of the operation data; means for determining whether the long distance communication means is available or not; and means for causing the second terminal-side communication unit to transmit the operation data received from the construction machine via the first terminal-side communication unit when determining that the long distance communication means is available.

Since the program according to the present invention enables output of the transmission start command from the mobile information terminal to the construction machine, when the construction machine is present in an area where the long distance communication means is not available, the program allows the mobile information terminal to receive operation data from the construction machine.

Further, when the long distance communication means is available, the program allows the mobile information terminal to transmit, to the server via the long distance communication means, operation data received from the construction machine.

Accordingly, in a condition where a construction machine is in operation in an area where long distance communication means is not available, the program according to the present invention allows a mobile information terminal to execute processing for accumulating operation data of the construction machine in a server.

The invention claimed is:

1. A construction machine capable of collecting operation data and transmitting the operation data to a server via long distance communication means, comprising:
   a first vehicle-side communication unit having a function of transmitting the operation data to the server via the long distance communication means;
   a second vehicle-side communication unit having a function of communicating with a mobile information terminal via short distance communication means for conducting communication in a distance shorter than a distance in the long distance communication means;
   a vehicle-side storage unit having a region for storing the operation data; and
   a vehicle-side control unit which determines whether the long distance communication means is available or not, when determining that the long distance communication means is available, controls the first vehicle-side communication unit so as to transmit the operation data via the long distance communication means, and when determining that the long distance communication means is not available, causes the vehicle-side storage unit to store the operation data, and further determines whether a transmission start command is received from the mobile information terminal or not, and when determining that the transmission start command is received, controls the second vehicle-side communication unit so as to transmit the operation data stored in the vehicle-side storage unit via the short distance communication means, wherein
   the vehicle-side control unit determines whether transmission of the operation data stored in the vehicle-side storage unit to the server normally ends or not, and when determining that the transmission normally ends, deletes the operation data stored in the vehicle-side storage unit from the vehicle-side storage unit.

2. The construction machine according to claim 1, wherein
when determining that the long distance communication means is available, the vehicle-side control unit determines whether the operation data is stored in the vehicle-side storage unit or not, and when determining that the operation data is stored in the vehicle-side storage unit, controls the first vehicle-side communication unit so as to transmit the operation data stored in the vehicle-side storage unit via the long distance communication means.

3. An information communication system comprising:
a server;
the construction machine according to claim 1 which has a function of communicating with the server via the long distance communication means; and
a mobile information terminal which has a function of communicating with the construction machine via the short distance communication means for conducting communication in a distance shorter than a distance in the long distance communication means, and a function of communicating with the server via the long distance communication means, wherein
the mobile information terminal comprises:
a first terminal-side communication unit having a function of communicating with the second vehicle-side communication unit of the construction machine via the short distance communication means;
a second terminal-side communication unit having a function of transmitting the operation data to the server via the long distance communication means; and
a terminal-side control unit which outputs a transmission start command for instructing transmission start of the operation data to the construction machine via the first terminal-side communication unit, and further determines whether the long distance communication means is available or not, and when determining that the long distance communication means is available, controls the second terminal-side communication unit so as to transmit, via the long distance communication means, the operation data received from the construction machine via the first terminal-side communication unit.

4. A mobile information terminal for receiving operation data from a construction machine and transmitting the operation data to a server, comprising:
a first terminal-side communication unit having a function of communicating with a second vehicle-side communication unit of the construction machine via a short distance communication means;
a second terminal-side communication unit having a function of transmitting the operation data to the server via a long distance communication means; and
a terminal-side control unit which outputs a transmission start command for instructing transmission start of the operation data to the construction machine via the first terminal-side communication unit, and further determines whether the long distance communication means is available or not, and when determining that the long distance communication means is available, controls the second terminal-side communication unit so as to transmit, via the long distance communication means, the operation data received from the construction machine via the first terminal-side communication unit, wherein
the construction machine comprises:
a first vehicle-side communication unit having a function of transmitting the operation data to the server via the long distance communication means;
a second vehicle-side communication unit having a function of communicating with a mobile information terminal via the short distance communication means for conducting communication in a distance shorter than a distance in the long distance communication means;
a vehicle-side storage unit having a region for storing the operation data; and
a vehicle-side control unit which determines whether the long distance communication means is available or not, when determining that the long distance communication means is available, controls the first vehicle-side communication unit so as to transmit the operation data via the long distance communication means, and when determining that the long distance communication means is not available, causes the vehicle-side storage unit to store the operation data, and further determines whether a transmission start command is received from the mobile information terminal or not, and when determining that the transmission start command is received, controls the second vehicle-side communication unit so as to transmit the operation data stored in the vehicle-side storage unit via the short distance communication means.

5. The mobile information terminal according to claim 4, further comprising a terminal-side storage unit having a region for storing the operation data, wherein
the terminal-side control unit, when determining that the long distance communication means is not available, causes the terminal-side storage unit to store the operation data received from the construction machine.

6. The mobile information terminal according to claim 5, wherein
the terminal-side control unit determines whether transmission of the operation data stored in the terminal-side storage unit to the server normally ends or not, and when determining that the transmission normally ends, deletes the operation data stored in the terminal-side storage unit from the terminal-side storage unit.

7. The mobile information terminal according to claim 4, further comprising an input unit for inputting, to the terminal-side control unit, a command to output the transmission start command.

8. The mobile information terminal according to claim 4, wherein
the terminal-side control unit controls the first terminal-side communication unit so as to transmit the transmission start command to the construction machine when a communication allowable condition is satisfied, the condition being set in advance to indicate that the second vehicle-side communication unit of the construction machine and the first terminal-side communication unit are communicable.

9. A non-transitory computer readable medium including a program to be implemented on a mobile information terminal for receiving operation data from a construction machine and transmitting the operation data to a server, wherein
the mobile information terminal includes:

a first terminal-side communication unit having a function of communicating with
a second vehicle-side communication unit of the construction machine via a short distance communication means; and
a second terminal-side communication unit having a function of transmitting the operation data to the server via a long distance communication means, and
the program causes the mobile information terminal to function as:
means for causing the first terminal-side communication unit to transmit a transmission start command to instruct transmission start of the operation data;
means for determining whether the long distance communication means is available or not; and
means for causing the second terminal-side communication unit to transmit the operation data received from the construction machine via the first terminal-side communication unit when determining that the long distance communication means is available, wherein
the construction machine comprises:
a first vehicle-side communication unit having a function of transmitting the operation data to the server via the long distance communication means;
the second vehicle-side communication unit having a function of communicating with the mobile information terminal via the short distance communication means for conducting communication in a distance shorter than a distance in the long distance communication means;
a vehicle-side storage unit having a region for storing the operation data; and
a vehicle-side control unit which determines whether the long distance communication means is available or not, when determining that the long distance communication means is available, controls the first vehicle-side communication unit so as to transmit the operation data via the long distance communication means, and when determining that the long distance communication means is not available, causes the vehicle-side storage unit to store the operation data, and further determines whether a transmission start command is received from the mobile information terminal or not, and when determining that the transmission start command is received, controls the second vehicle-side communication unit so as to transmit the operation data stored in the vehicle-side storage unit via the short distance communication means.

* * * * *